(12) United States Patent
Li et al.

(10) Patent No.: US 10,719,240 B2
(45) Date of Patent: Jul. 21, 2020

(54) METHOD AND DEVICE FOR MANAGING A STORAGE SYSTEM HAVING A MULTI-LAYER STORAGE STRUCTURE

(71) Applicant: EMC IP Holding Company LLC, Hopkinton, MA (US)

(72) Inventors: Liam Xiongcheng Li, Beijing (CN); Xinlei Xu, Beijing (CN); Jian Gao, Beijing (CN); Lifeng Yang, Beijing (CN); Yousheng Liu, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 126 days.

(21) Appl. No.: 15/846,350

(22) Filed: Dec. 19, 2017

(65) Prior Publication Data

US 2018/0173431 A1   Jun. 21, 2018

(30) Foreign Application Priority Data

Dec. 21, 2016   (CN) .......................... 2016 1 1194068

(51) Int. Cl.
*G06F 3/06* (2006.01)

(52) U.S. Cl.
CPC .......... *G06F 3/0611* (2013.01); *G06F 3/0607* (2013.01); *G06F 3/0659* (2013.01); *G06F 3/0665* (2013.01); *G06F 3/0685* (2013.01)

(58) Field of Classification Search
CPC .... G06F 3/0607; G06F 3/0611; G06F 3/0659; G06F 3/0665; G06F 3/0685; G06F 3/0604; G06F 3/061; G06F 3/0656; G06F 2003/0691

See application file for complete search history.

(56) References Cited

U.S. PATENT DOCUMENTS

| | | | |
|---|---|---|---|
| 7,849,504 B2 | 12/2010 | Noghanian et al. | |
| 8,085,794 B1 | 12/2011 | Niver et al. | |
| 8,577,680 B2 | 11/2013 | Claudatos et al. | |
| 9,806,984 B1 | 10/2017 | Tolstoy et al. | |
| 10,025,510 B1 | 7/2018 | Koli et al. | |
| 10,061,540 B1 | 8/2018 | Koli et al. | |
| 2011/0055458 A1* | 3/2011 | Kuehne | G06F 12/0246 711/103 |
| 2013/0185508 A1* | 7/2013 | Talagala | G06F 12/0871 711/118 |
| 2016/0378656 A1* | 12/2016 | Kudo | G06F 12/0815 711/143 |

* cited by examiner

*Primary Examiner* — Larry T MacKall
(74) *Attorney, Agent, or Firm* — BainwoodHuang (57) ABSTRACT

A method and device for managing a storage system. In one embodiment of the present invention, there is proposed a method for managing a storage system. In the method, in response to receiving a write request with respect to the data storage system, acquiring a destination address associated with the write request, the destination address being an address in the storage device; a source address associated with data to be written to the destination address is acquired, where the source address is an address in the storage device. The buffer device is searching for the source address on the basis of an association relationship between a page included in the buffer device and an address in the storage device. Information associated with the destination address is updated on the basis of a result of the search.

20 Claims, 10 Drawing Sheets

METHOD AND DEVICE FOR MANAGING A STORAGE SYSTEM HAVING A MULTI-LAYER STORAGE STRUCTURE

RELATED APPLICATIONS

This application claim priority from Chinese Patent Application Number CN201611194068.3, filed on Dec. 21, 2016 at the State Intellectual Property Office, China, titled "METHOD AND APPARATUS FOR MANAGING STORAGE SYSTEM" the contents of which is herein incorporated by reference in its entirety

FIELD

Various embodiments of the present invention relate to storage management, and more specifically, to a method and device for managing a storage system.

BACKGROUND

With the development of data storage techniques, various data storage devices now provide users with higher and higher data storage capacity, and also their data access speed has been increased greatly. Besides the increase of data storage capacity, users also impose greater and greater demands on data reliability and response time of storage systems.

So far multi-level caching techniques have been developed to cache recently accessed data. At this point, recently accessed data may reside in a buffer device with a high speed; when an access request with respect to these data is received again, data may be directly provided from the buffer device, rather than being loaded from an underlying storage device with a low speed. However, a data write request might move or modify accessed data, which will be processed as new data. At this point, the hit rate of data in the buffer device will be reduced, and further the buffer device cannot fulfill desired functions.

SUMMARY

Therefore, it is desirable to develop and implement a technical solution that is capable of reducing a response time of a storage system and further improve access performance of the storage system. It is desired that the technical solution can be compatible with existing storage systems and manage storage areas in the storage system more efficiently without extra hardware devices added to existing storage systems.

In one embodiment of the present invention, there is provided a method for managing a storage system, the storage system comprising a storage device and a buffer device. The method comprises: in response to receiving a write request with respect to the data storage system, acquiring a destination address associated with the write request, the destination address being an address in the storage device; acquiring a source address associated with data to be written to the destination address, the source address being an address in the storage device; searching for the source address in the buffer device on the basis of an association relationship between a page included in the buffer device and an address in the storage device; and updating information associated with the destination address on the basis of a result of the search.

In one embodiment of the present invention, there is provided a device for managing a storage system, comprising: one or more processors; a memory coupled to at least one processor of the one or more processors; computer program instructions stored in the memory which, when executed by the at least one processor, cause the device to execute a method for managing a storage system, the method comprising: in response to receiving a write request with respect to the data storage system, acquiring a destination address associated with the write request, the destination address being an address in the storage device; acquiring a source address associated with data to be written to the destination address, the source address being an address in the storage device; searching for the source address in the buffer device on the basis of an association relationship between a page included in the buffer device and an address in the storage device; and updating information associated with the destination address on the basis of a result of the search.

In one embodiment of the present invention, there is provided a device for managing a storage system, the storage system comprising a storage device and a buffer device. The device comprises: a source address acquiring module configured to, in response to receiving a write request with respect to the data storage system, acquire a destination address associated with the write request, the destination address being an address in the storage device; a destination address acquiring module configured to acquire a source address associated with data to be written to the destination address, the source address being an address in the storage device; a searching module configured to search for the source address in the buffer device on the basis of an association relationship between a page included in the buffer device and an address in the storage device; and a managing module configured to update information associated with the destination address on the basis of a result of the search.

With the technical solution of the present invention, the response time of the storage system may be reduced, and further the storage system may be managed with higher efficiency.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
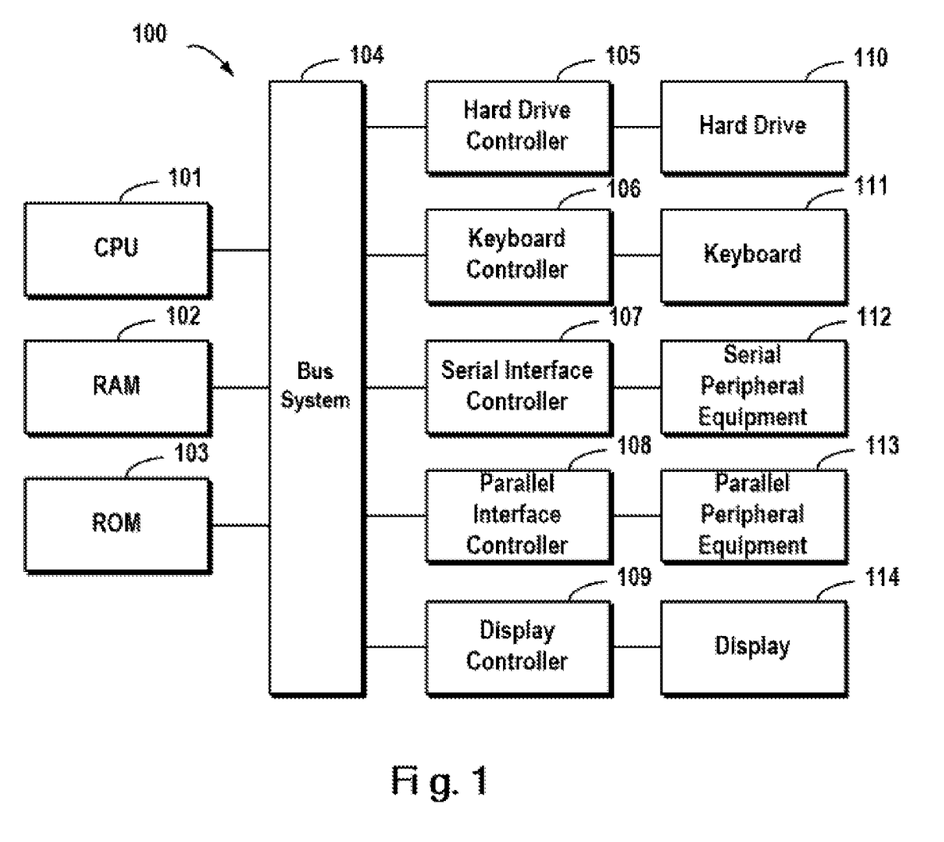
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
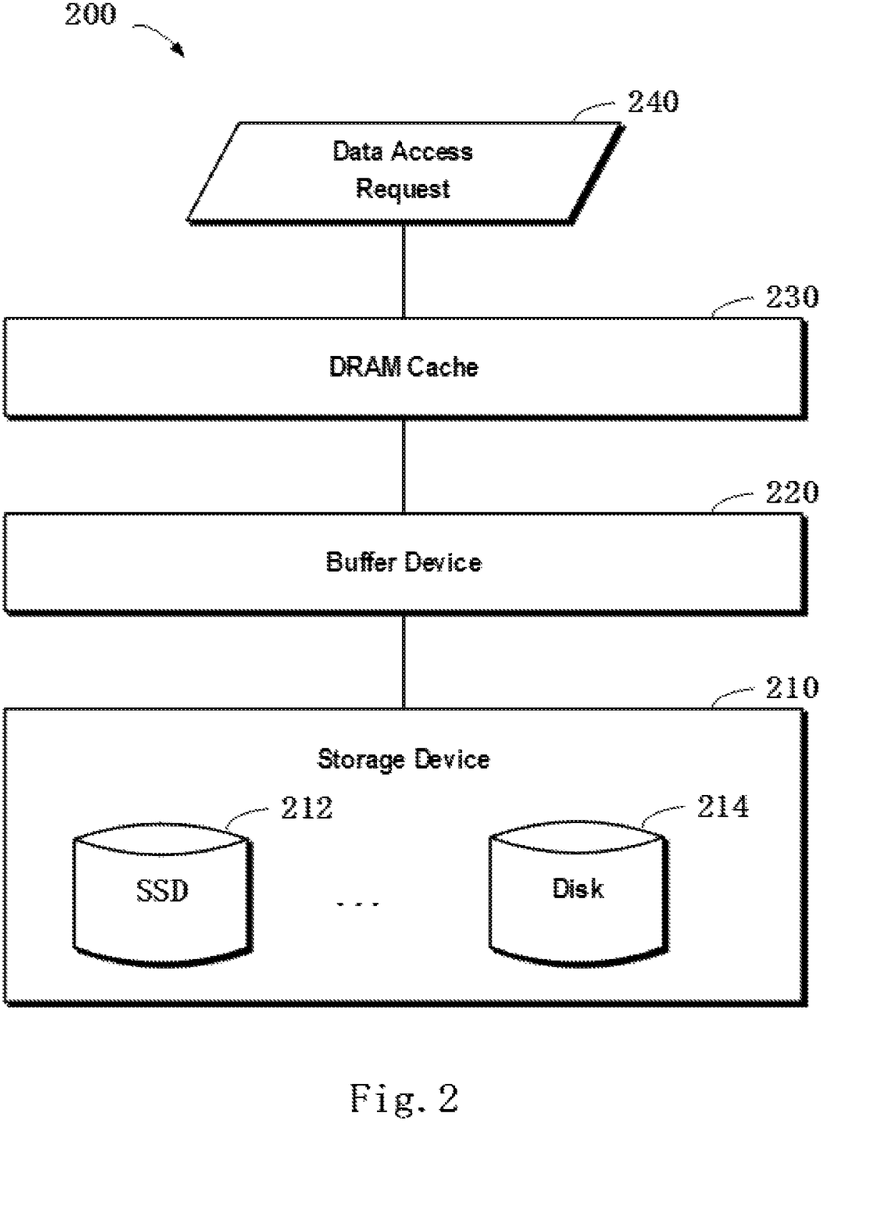
FIG. 2 schematically illustrates a block diagram an application environment where the embodiments of the present invention may be implemented.

FIG. 2 shows a schematic view 200 of an application environment in which the embodiments of the present invention may be implemented. As shown in FIG. 2, a storage system may comprise, for example, three layers of storage structures: a storage device 210 is an underlying storage device, e.g., may comprise a solid state disk (SSD) 212 and/or a disk 214. The storage device 210 has a lower data access speed, whereas such a type of storage media has a large storage capacity and is cheap, and thus may provide a large capacity of data storage for a data system. A buffer device 220 (e.g., SSD cache) has a quite high data access speed. This type of storage media may be used as a buffer device, and recently accessed data may be loaded from the storage device 210 to the buffer device so as to provide higher response efficiency for future data access. A dynamic random access memory (DRAM) cache 230 has a much faster data access speed, to which the most-recently accessed data or important data may be loaded, so that data access requests may be served with higher efficiency.

When the storage system receives a data access request 240, DRAM cache 230 and the buffer device 220 may be sequentially searched. If a hit occurs in the searching, the received access request 240 may be served directly on the basis of data in these fast devices. If a miss occurs in the searching, then data has to be fetched from the slow storage device 210. In this way, the three-layer storage structures 210, 220 and 230 may act in coordination so as to provide a rapid data response.

Although the three-layer storage structures as shown in FIG. 2 can accelerate a data response speed to some extent, the operating efficiency of the technical solution is rather low in case cases. For example, suppose a frequently accessed data block has been loaded to the buffer device 220, whereas the data block is copied from an address ADDRESS1 to an address ADDRESS2. Although content of the data block to be accessed already resides in the buffer device 220, the change of address makes it impossible to find the data block in the buffer device 220 (i.e., a miss), at which point the data block has to be re-loaded from the storage device 210.

For another example, a loading regulation specifies: after a data block is accessed 3 times within a specified period of time, then the data block is loaded to the buffer device 220. Suppose a data block has been accessed 2 times, and subsequently the data block is copied from ADDRESS1 to ADDRESS2, then at this point the change of address makes the count 2 of historical access with respect to the data block no longer effective. The statistical count of a data block at ADDRESS2 will be initialized to 0, and the data block cannot be loaded to the buffer device 20 until the access count reaches 3.

Apparently although the multi-layer storage structure can accelerate a response to data access operations, its operating efficiency is rather satisfactory in the foregoing circumstances. Therefore, it is desirable to develop a technical solution that is capable of managing a storage system with higher efficiency.

In one embodiment of the present invention, there is proposed a method for managing a storage system, the storage system comprising a storage device and a buffer device. The method comprises: in response to receiving a write request with respect to the data storage system, acquiring a destination address associated with the write request, the destination address being an address in the storage device; acquiring a source address associated with data to be written to the destination address, the source address being an address in the storage device; searching for the source address in the buffer device on the basis of an association relationship between a page included in the buffer device and an address in the storage device; and updating information associated with the destination address on the basis of a result of the search.

Figure 3:
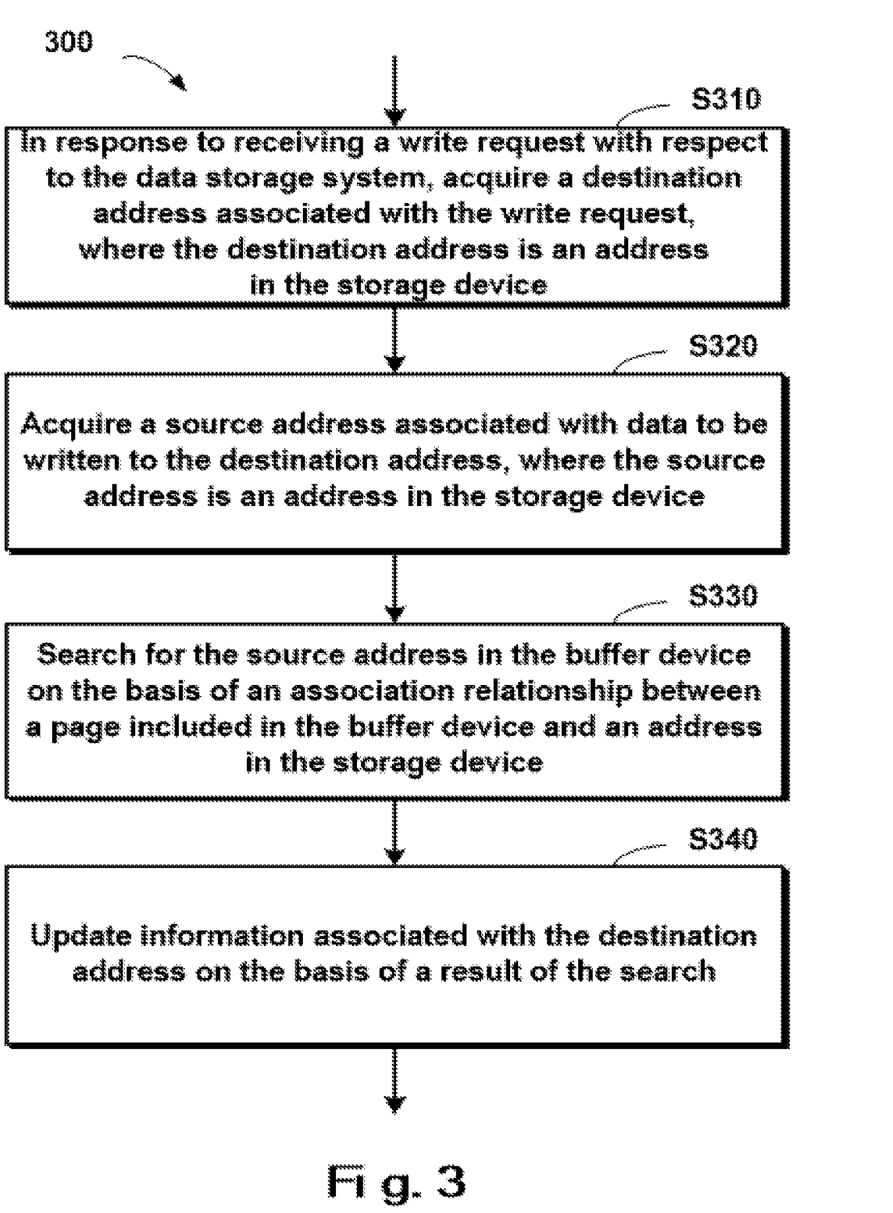
FIG. 3 schematically illustrates a flowchart of a method for managing a storage system according to one embodiment of the present invention.

Specifically, FIG. 3 schematically shows a flowchart 300 of a method for managing a storage system according to one embodiment of the present invention. In step S310, in response to receiving a write request with respect to the data storage system, a destination address associated with the write request is acquired. In this step, the destination address is an address in the storage device. The destination address is an address to which data will be written.

In step S320, a source address associated with data to be written to the destination address is acquired, the source address being an address in the storage device. In this embodiment, the source address may be stored in association with the write request. For example, the source address may be included in the write request, or stored in other position. For example, the write request may include the source address and the destination address. At this point, the write request indicates it is desirable to write data at the source address to the destination address.

In step S330, the source address is searched for in the buffer device on the basis of an association relationship between a page included in the buffer device and the source address. In previous operations, data associated with a previous data access request might have been stored in the buffer device, at which point source data associated with the source address may be searched for in the buffer device.

In step S340, information associated with the destination address is updated on the basis of a result of the search. Various operations may be performed in light of different results of the search. The process of a concrete operation will be described below with reference to a specific example.

Figure 4:
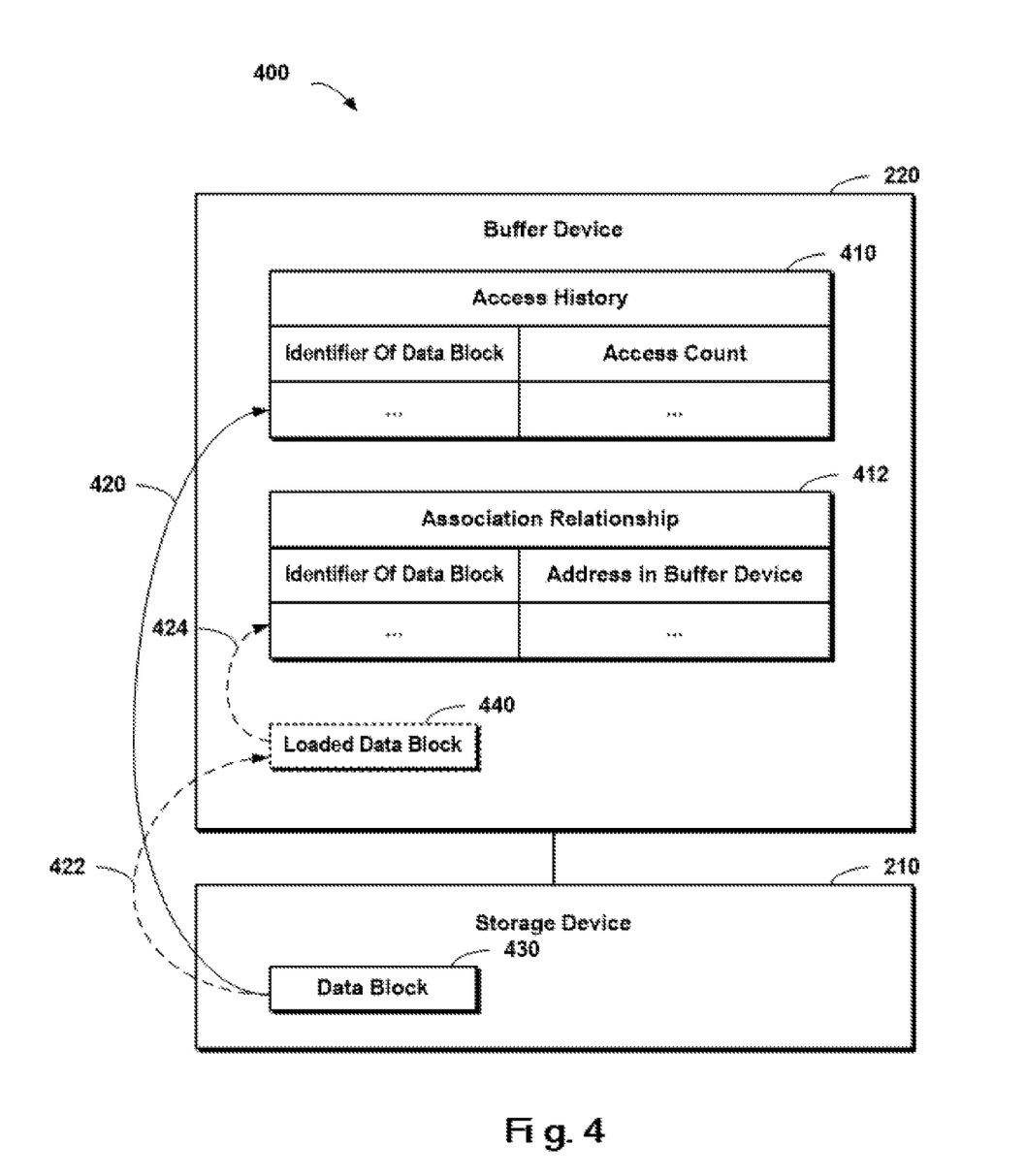
FIG. 4 schematically illustrates a block diagram of a technical solution for managing a storage system according to one embodiment of the present invention.

FIG. 4 schematically shows a block diagram 400 of a technical solution for managing a storage system according to one embodiment of the present invention. As depicted, the buffer device 220 may include an access history 410 for storing data associated with an access history of data access. Various approaches may be taken as an identifier of a data block. For example, the address of a data block may be used as the identifier. As shown in FIG. 4, the access history 410 may include the identifier of a data block and the count of historical access (e.g., within a predetermined period of time) to the data block. For a specific data block (e.g., a data block 430 in the storage device 210), within a predetermined period of time, if the data block 430 is accessed by one data access request, then the count of access (e.g., access count in the access history 410) to the data block 430 may be increased by one. When the access count reaches a threshold (e.g., 3 times), then the data block 430 may be loaded to the buffer device 220 (as shown by an arrow 422).

At this point a loaded data block 440 in the buffer device 20 corresponds to the data block 430 in the storage device 210. The buffer device 220 may further include an association relationship 412 for recording an association relationship between an identifier of a data block (e.g., an address where the data block 430 is stored in the storage device 210) and an address of the corresponding loaded data block 440 in the buffer device 220. In light of the association relationship, it may be determined whether the data block 430 has been loaded to the buffer device 220.

In one embodiment of the present invention, the updating information associated with the destination address on the basis of a result of the search comprises: in response the source address being missed in the buffer device, setting an access count associated with the destination address on the basis of an access count associated with the source address. In this embodiment, "miss" indicates that in the buffer device there does not exist data associated with the source address. Concrete information of the method in FIG. 3 will be described in detail with reference to the architecture shown in FIG. 4. Suppose the write request is a copy operation and an associated source address is ADDRESS1 and destination address is ADDRESS2, then the write request means copying data at the source address ADDRESS1 to ADDRESS2.

Note that the source address being missed in the buffer device 220 indicates: data associated with the source address has not been loaded to the buffer device 220. After the write operation, data at the source address will be copied to the destination address. Since data at the destination address after the copy is totally same as data at the source address, at this point an access count associated with the destination address may be updated using an access count associated with the source address. In this way, whether the data block is "hot" or "cold" may be determined on the basis of a history of access to the data block. In the embodiments of the present invention, the source address ADDRESS1 has been accessed 1 time, at which point the access history 410 may be represented as Table 1 below:

TABLE 1

Example of Access History

| Identifier of Data Block | Access Count |
|---|---|
| ADDRESS1 | 1 |
| . . . | . . . |

After receiving the write operation, the data block at the source address ADDRESS1 is copied to the destination address ADDRESS2. According to the embodiments of the present invention, an access history associated with ADDRESS2 is set on the basis of an access history associated with ADDRESS1, at which point the access history shown in Table 1 may be updated as Table 2:

TABLE 2

Example of Access History

| Identifier of Data Block | Access Count |
|---|---|
| ADDRESS2 | 2 |
| . . . | . . . |

In one embodiment of the present invention, the write request may be an overwrite request (which indicates first data at the source address is modified and then the modified data is written to the destination address). Since there is a close relation between data at two addresses involved in the overwrite request, the processing may be based on the method described above.

The setting an access history associated with the destination address on the basis of an access history associated with the source address serves a purpose of tracking historical states of access to content in the data block, rather than only recording historical states of access to the data block at the destination address. In this way, the count of access to data at the source address may be added up to the count of access to the data block at the destination address, and further the cold or hot degree of data may be represented more accurately.

For a traditional technical solution, the buffer device only records an association relationship between a current identifier of a data block and an address in the buffer device, but does not record a copy/overwrite history of the data block. Therefore, once the data block is copied or overwritten to a new address (i.e., destination address), the data block is treated as a new data block and an access count will be reset. In the meanwhile, loaded data which has been loaded to the buffer device will get cold gradually and be released from the buffer device.

Figure 5A:
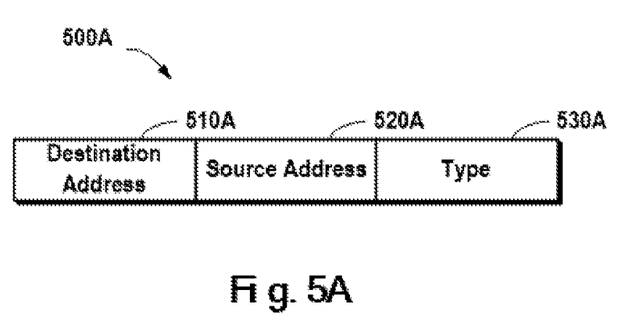
FIGS. 5A and 5B each schematically illustrate a block diagram of a data structure of a write operation for performing a write to the storage system according to one embodiment of the present invention.
Figure 5B:
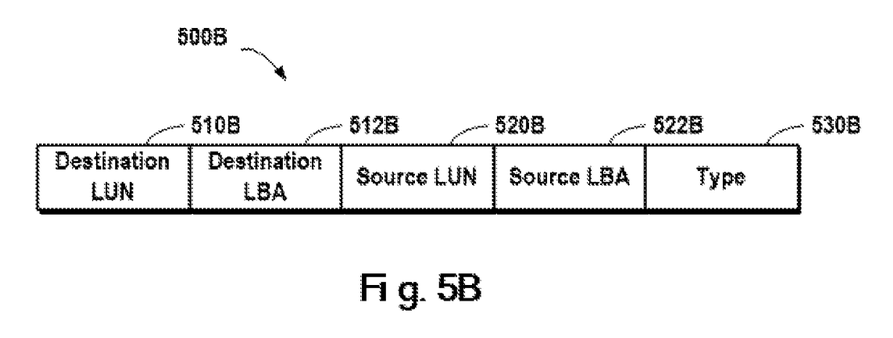

FIGS. 5A and 5B each schematically show a block diagram 500A, 500B of a data structure of a write operation for performing a write to the storage system according to one embodiment of the present invention. As shown in FIG. 5A, the write request may include a destination address 510A, a source address 520A and a write type 530A. Here the write type 530A may be a copy type or an overwrite type. The copy type indicates data at the source address 520A will be directly copied to the destination address 510A, while the overwrite type indicates data at the source address 520A will be written to the destination address 510A subsequent to being modified. A detailed description is presented below to concrete operations related to the two different types.

FIG. 5B shows an example of another data structure for a write request. In this example, a destination address may include a destination logic unit number (LUN) 510B and a destination logical block address (LBA) 512B. Similarly, a source address may include a source LUN 520B and a source LBA 522B. A type 530B is similar to the type 530A shown in FIG. 5A, a description of which is omitted here.

In one embodiment of the present invention, the acquiring the source address and the destination address comprises: acquiring the destination address and the source address from the data write request. In this embodiment, when the data structure as shown in FIG. 5A is adopted, the destination address and the source address may be directly extracted from the write request. When the data structure as shown in FIG. 5B is adopted, the destination LUN 510B and the destination LBA 512B may be taken as the destination address, and the source LUN 520B and the source LBA 522B may be taken as the source address.

In one embodiment of the present invention, there is further comprised: in response to the access count associated with the destination address meeting a threshold condition, loading data at the destination address to a destination page in the buffer device; and establishing an association relationship between the destination page and the destination address.

Figure 6A:
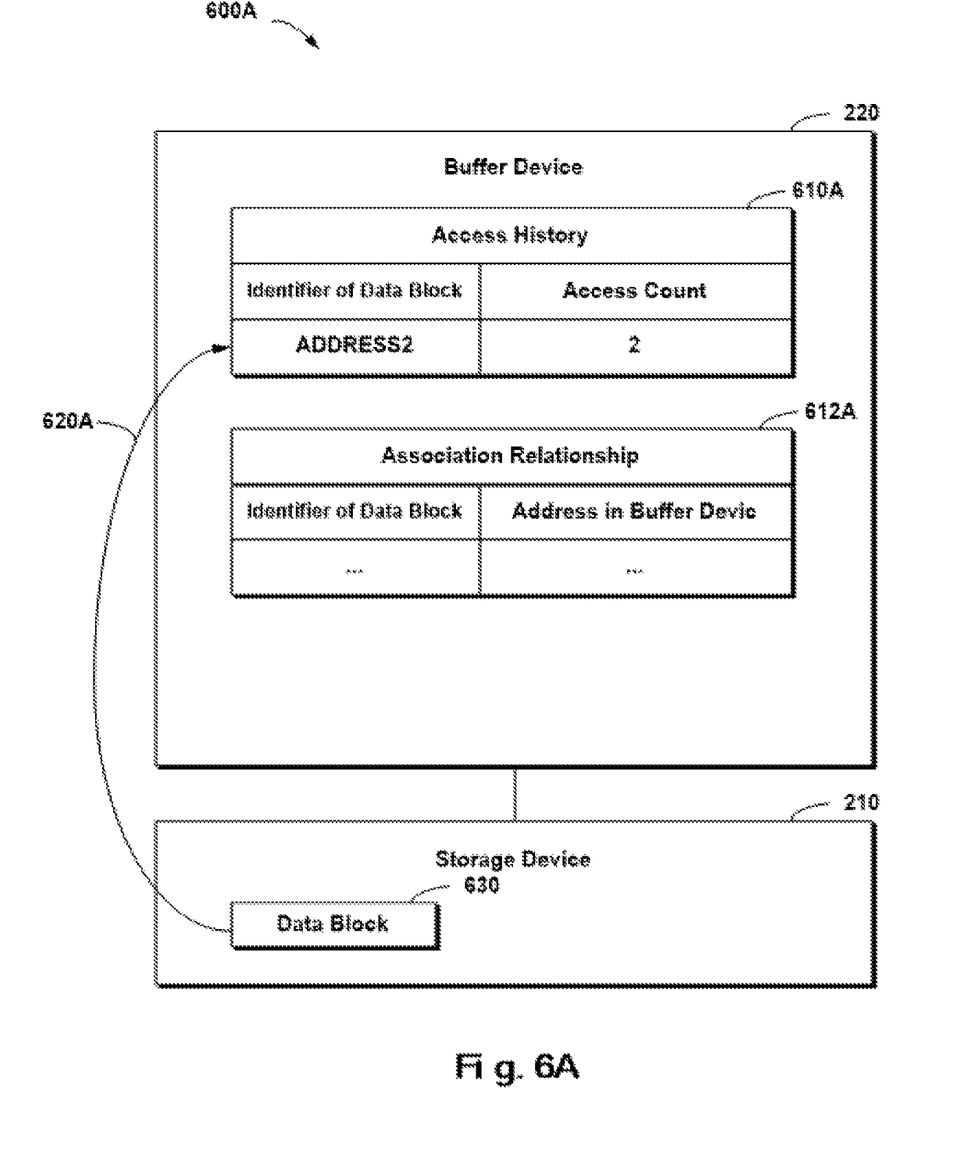
FIGS. 6A and 6B schematically illustrate respective block diagrams of different stages for loading data to a buffer device according to one embodiment of the present invention.
Figure 6B:
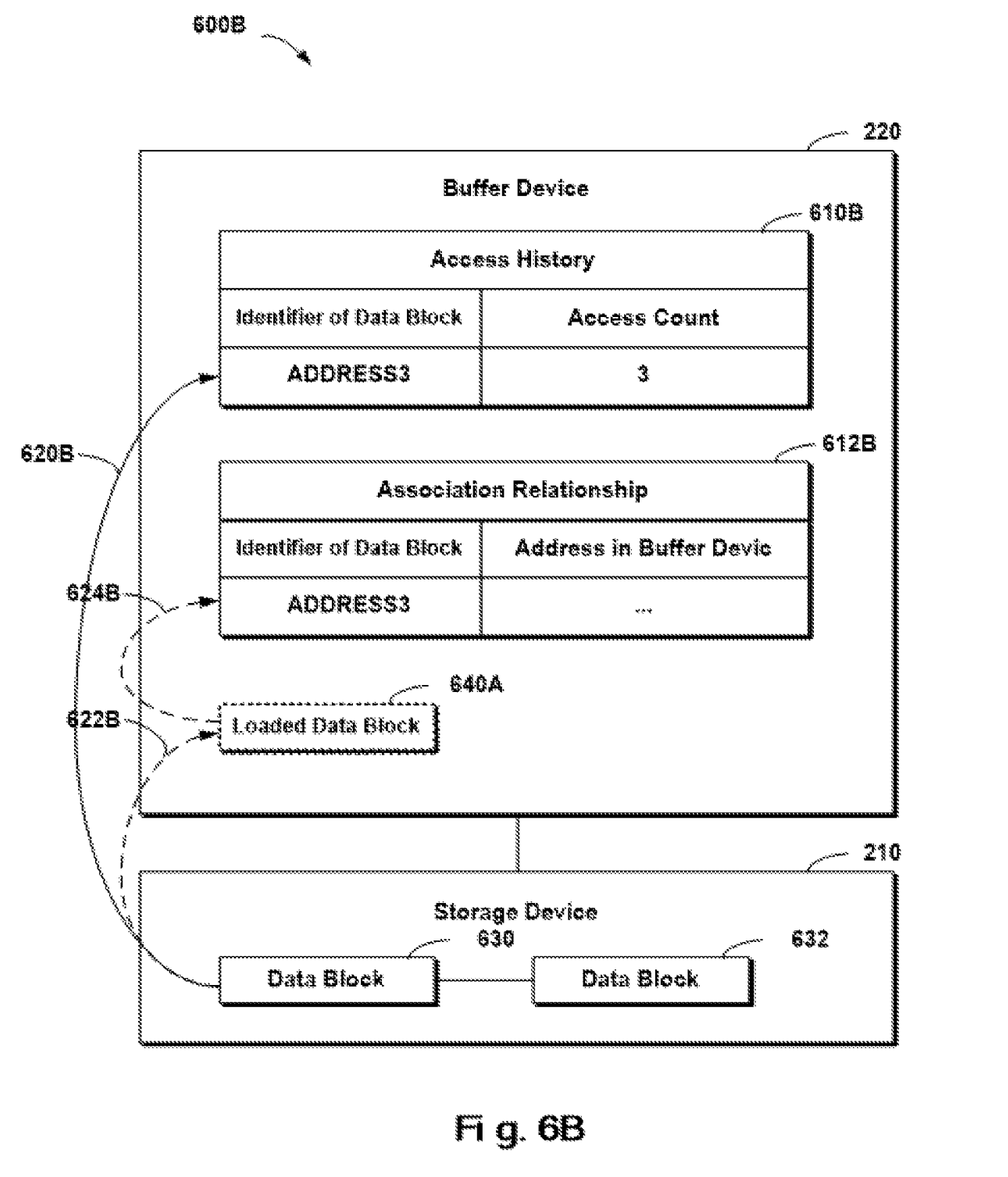

FIGS. 6A and 6B schematically show respective block diagrams 600A and 600B of different stages for loading data to a buffer device according to one embodiment of the present invention. Continue the foregoing example, suppose a source address in a write request is ADDRESS2 and a destination address is ADDRESS3, and an access history is an access history 610A as shown in FIG. 6A. At this point, an access count of data at the source address ADDRESS2 is 2 (as shown in FIG. 6A). When a current write request is received, as shown by an access history 610B in FIG. 6B, the access count should be 2+1=3. After performing a copy, data at ADDRESS2 has been loaded to ADDRESS3, so an "identifier of data block" in the access history 610B should be modified as ADDRESS3. At this point, the access history as shown in Table 2 initially should be updated as shown in Table 3 below.

TABLE 3

Example of Access History

| Identifier of Data Block | Access Count |
|---|---|
| ADDRESS3 | 3 |
| ... | ... |

Note since the write operation at this point is a copy operation, content of a data block 632 at the destination address ADDRESS3 is completely same as content of a data block 630 at the source address ADDRESS2. As the access count has reached the threshold at this point, the correlated data block 630 should be loaded to the buffer device 220 (as shown by an arrow 622B) and become a loaded data block 640A. Further, an identifier of a data block in an association relationship 612B in FIG. 6B should be modified as ADDRESS3 so as to indicate a latest address of the current data block is ADDRESS3.

In one embodiment of the present invention, the updating information associated with the destination address on the basis of a result of the search comprises: in response to the source address being hit in the buffer device, determining a write type of the write request; and managing the storage system on the basis of the write type. That the write operation may include a copy type and an overwrite type has been described above. Hereinafter, concrete steps associated with a hit will be described in detail.

In one embodiment of the present invention, the managing the storage system on the basis of the write type comprises: in response to the write type being an overwrite type that indicates data from the source address after being modified will be written to the destination address, allocating a destination page in the buffer device for the destination address; writing the modified data to the destination page; and establishing an association relationship between the destination page and the destination address.

In this embodiment, the overwrite type indicates data at the source address is first modified and then the modified data is written to the destination address. At this point, first data at the source address which has been loaded to the buffer device needs to be modified, and subsequently the modified loaded data is written to the destination address. Therefore, data loaded to the buffer device is no longer effective, and the write operation of the overwrite type cannot be processed by directly modifying an association relationship.

Figure 7:
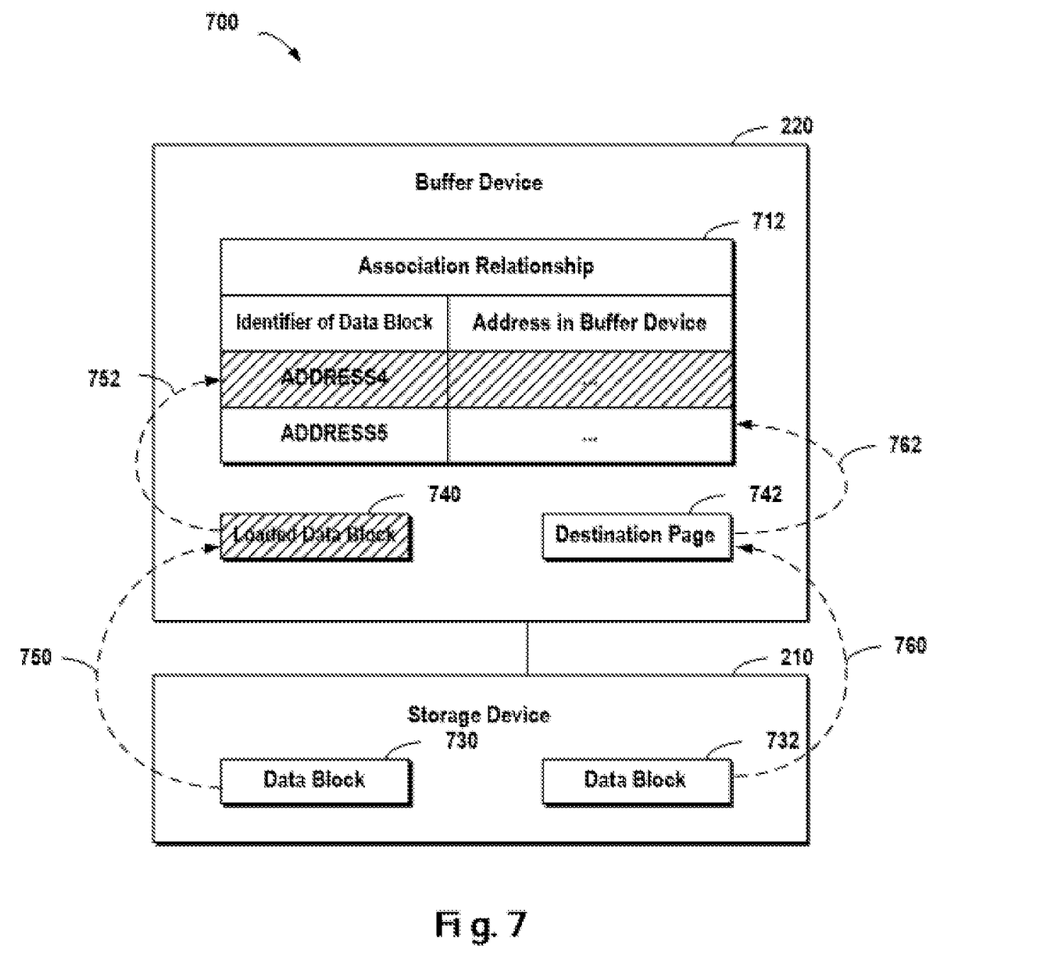
FIG. 7 schematically illustrates a block diagram of a technical solution for performing an overwrite-type write operation according to one embodiment of the present invention.

Specifically, FIG. 7 schematically shows a block diagram 700 of a technical solution for performing an overwrite-type write operation according to one embodiment of the present invention. Suppose content in a write request is as below: a source address is ADDRESS4, a destination address is ADDRESS5, and a write type is overwrite. At this point, a loaded data block 740 associated with the source address has been loaded in the buffer device 220 (hit). An arrow 750 shows a loading process (a data block 730 in the storage device 210 is loaded to the buffer device 220), and an arrow 752 shows a mapping between the loaded data block 740 and an association relationship 712.

In this example, the write operation serves a purpose of writing data at ADDRESS4 to ADDRESS after being modified. Since data to be written at this point is a modified version of data coming from the source address, and the data loaded in the buffer 220 is not data which will be finally written, a new page needs to be allocated in the buffer device 220 for storing modified data.

As shown in FIG. 7, a destination page 742 is allocated in the buffer device 220, and modified data is written to the destination page 742. Subsequently, information associated with the destination page 742 needs to be written to the association relationship 712. Specifically, the destination address ADDRESS5 is used as an identifier of the data block, and an address of the destination page 742 in the buffer device 220 is written to a corresponding position in the association relationship 712. In addition, as shown by arrows 760 and 762, the destination address ADDRESS5 in the association relationship 712 is an address of data 732 in the storage device 210. At this point, since the loaded data block 740 is useless, it should be removed from the buffer device 220, and corresponding information in the association relationship 712 will be deleted. As shown in FIG. 7, information shown as shadow portions may be deleted at this point.

In one embodiment of the present invention, the writing the modified data to the destination page comprises: reading data from a page associated with the hit; modifying the read data; and writing the modified data to the destination page. Concrete steps of this embodiment are described with reference to the foregoing example. As shown in FIG. 7, in this example, a page associated with the hit is a page where the loaded data block 740 is located, so data in the loaded data block 740 may be first read and then modified, and later the modified data is written to the destination page 742.

In one embodiment of the present invention, an association relationship between a page associated with the hit and the source address is cleared; and the page associated with the hit is released. Continuing the foregoing example, at this point a step of clearing an association relationship may comprise: clearing an item associated with ADDRESS4 from the association relationship 712 as shown in FIG. 7. And a step of releasing may comprise: releasing the loaded data block 740.

As compared with the prior art, this embodiment may more quickly release pages in the buffer device which are no longer used. In the prior art, it is necessary to wait for the hit page to get cold gradually before releasing the page on the basis of a conventional release rule of the buffer device. In the prior art, for example, according to the least recently used principle, the page will get cold over a period of time and further be released. Before the page is released, the page will occupy storage resources in the buffer device, which might lead to a shortage of available page resources in the buffer device. Unlike a technical solution in the prior art, the embodiments of the present invention release pages, which are no longer used, immediately after the overwrite operation so as to provide more available spaces for the buffer device.

In one embodiment of the present invention, the updating information associated with the destination address on the basis of the write type comprises: in response to the write type being a copy type that indicates data from the source address is to be written to the destination address, establishing an association relationship between a page associated with the hit and the destination address. In this embodiment, when the write type is a copy type, since content of the data block does not change, the loaded data block in the current buffer device may be directly used as a data block associated with the destination address.

Figure 8:
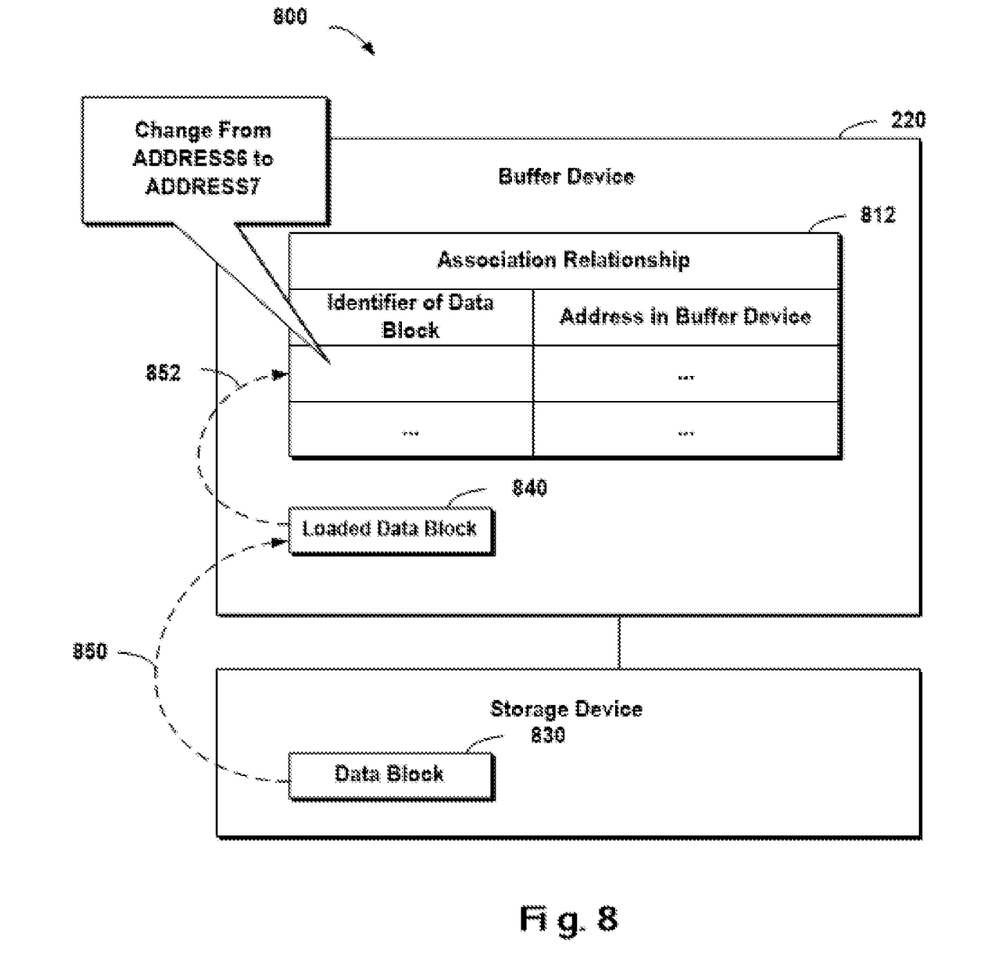
FIG. 8 schematically illustrates a block diagram of a technical solution for performing a copy-type write operation according to one embodiment of the present invention.

Specifically, FIG. 8 schematically shows a block diagram 800 of a technical solution for performing a copy-type write operation according to one embodiment of the present invention. Suppose content in a write request is as below: a source address is ADDRESS6, a destination address is ADDRESS7, and a write type is copy. At this point, a loaded data block 840 associated with the source address has been loaded in the buffer device 220 (hit). An arrow 850 shows a loading process, and an arrow 852 shows a mapping between the loaded data block 840 and an association relationship 812.

In this example, the write operation serves a purpose of directly writing data at ADDRESS6 to ADDRESS7. Therefore, there is no need to apply for a new destination page, but the loaded data block 840 may be directly used as a data block associated with the destination address ADDRESS7. Afterwards, the association relationship 812 needs to be updated. Specifically, an identifier of the data block may be updated from ADDRESS6 to ADDRESS7.

In one embodiment of the present invention, in response to a page in the buffer device being updated, the updated page is flushed to the storage device in the storage system on the basis of the association relationship. In this embodiment, when data in the buffer device is updated, the updated data further needs to be flushed to the storage device in the storage system.

In one embodiment of the present invention, the storage device may be an SSD storage device, a disk storage device or a combination thereof. In one embodiment of the present invention, the buffer device may be a DRAM cache or a FAST cache. In one embodiment of the present invention, the storage system may be a distributed storage system or a centralized storage system. In one embodiment of the present invention, the storage system may be a Redundant Array of Independent Disks (RAID) storage system. In one embodiment of the present invention, the access history may be stored in a shadow list in the buffer device, and the association relationship may be stored in a hash data structure.

Figure 9:
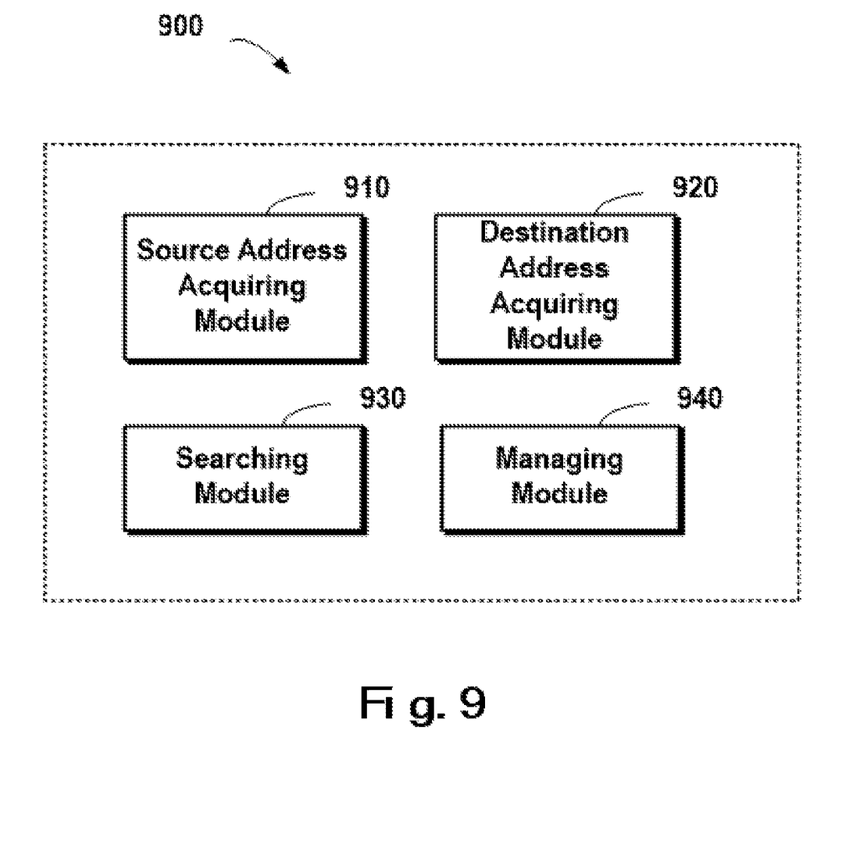
FIG. 9 schematically illustrates a block diagram of a device for managing a storage system according to one embodiment of the present invention.

FIG. 9 schematically shows a block diagram of a device for managing a storage system according to one embodiment of the present invention. As shown in FIG. 9, there is provided a device for managing a storage system, the storage system comprising a storage device and a buffer device. The device comprises: a source address acquiring module 910 configured to, in response to receiving a write request with respect to the data storage system, acquire a destination address associated with the write request, the destination address being an address in the storage device; a destination address acquiring module 920 configured to acquire a source address associated with data to be written to the destination address, the source address being an address in the storage device; a searching module 930 configured to search for the source address in the buffer device on the basis of an association relationship between a page included in the buffer device and an address in the storage device; and a managing module 940 configured to update information associated with the destination address on the basis of a result of the search.

In one embodiment of the present invention, the searching module 930 is further configured to: in response the source address being missed in the buffer device, set an access count associated with the destination address on the basis of an access count associated with the source address.

In one embodiment of the present invention, the managing module 940 is further configured to: in response to the access count associated with the destination address meeting a threshold condition, load data at the destination address to a destination page in the buffer device; and establish an association relationship between the destination page and the destination address.

In one embodiment of the present invention, the managing module 940 is further configured to: in response to the source address being hit in the buffer device, determine a write type of the write request; and manage the storage system on the basis of the write type.

In one embodiment of the present invention, the managing module 940 is further configured to: in response to the write type being an overwrite type that indicates data from the source address after being modified will be written to the destination address, allocate a destination page in the buffer device for the destination address; write the modified data to the destination page; and establish an association relationship between the destination page and the destination address.

In one embodiment of the present invention, the managing module 940 is further configured to: read data from a page associated with the hit; modify the read data; and write the modified data to the destination page.

In one embodiment of the present invention, the managing module 940 is further configured to: clear an association relationship between a page associated with the hit and the source address; and release the page associated with the hit.

In one embodiment of the present invention, the managing module 940 is further configured to: in response to the write type being a copy type that indicates data from the source address is to be written to the destination address, establish an association relationship between a page associated with the hit and the destination address.

In one embodiment of the present invention, the managing module 940 is further configured to: in response to a page in the buffer device being updated, flush the updated page to the storage device on the basis of the association relationship.

In one embodiment of the present invention, the source address acquiring module 910 and the destination address acquiring module 920 are further configured to: acquire the destination address and the source address from the data write request.

In one embodiment of the present invention, there is provided a device for managing a storage system, comprising: one or more processors; a memory coupled to at least one processor of the one or more processors; computer program instructions stored in the memory which, when executed by the at least one processor, cause the device to execute a method for managing a storage system. The method comprises: in response to receiving a write request with respect to the data storage system, acquiring a destination address associated with the write request, the destination address being an address in the storage device; acquiring a source address associated with data to be written to the destination address, the source address being an address in the storage device; searching for the source address in the buffer device on the basis of an association relationship between a page included in the buffer device and an address in the storage device; and updating information associated with the destination address on the basis of a result of the search.

In one embodiment of the present invention, the updating information associated with the destination address on the basis of a result of the search comprises: in response the source address being missed in the buffer device, setting an access count associated with the destination address on the basis of an access count associated with the source address.

In one embodiment of the present invention, the method further comprises: in response to the access count associated with the destination address meeting a threshold condition, loading data at the destination address to a destination page in the buffer device; and establishing an association relationship between the destination page and the destination address.

In one embodiment of the present invention, the updating information associated with the destination address on the basis of a result of the search comprises: in response to the source address being hit in the buffer device, determining a write type of the write request; and managing the storage system on the basis of the write type.

In one embodiment of the present invention, the updating information associated with the destination address on the basis of the write type comprises: in response to the write type being an overwrite type that indicates data from the source address after being modified will be written to the destination address, allocating a destination page in the buffer device for the destination address; writing the modified data to the destination page; and establishing an association relationship between the destination page and the destination address.

In one embodiment of the present invention, the writing the modified data to the destination page comprises: reading data from a page associated with the hit; modifying the read data; and writing the modified data to the destination page.

In one embodiment of the present invention, the method further comprises: clearing an association relationship between a page associated with the hit and the source address; and releasing the page associated with the hit.

In one embodiment of the present invention, the updating information associated with the destination address on the basis of the write type comprises: in response to the write type being a copy type that indicates data from the source address is to be written to the destination address, establishing an association relationship between a page associated with the hit and the destination address.

In one embodiment of the present invention, the method further comprises: in response to a page in the buffer device being updated, flushing the updated page to the storage device in the storage system on the basis of the association relationship.

In one embodiment of the present invention, the acquiring the source address and the destination address comprises: acquiring the destination address and the source address from the data write request.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for managing a storage system, the storage system comprising a multi-layer storage structure including at least a buffer device and an underlying storage device, the method comprising:
    in response to receiving a write request with respect to the storage system, acquiring a destination address associated with the write request, the destination address being an address in the underlying storage device;
    acquiring a source address associated with data to be written to the destination address, the source address being an address in the underlying storage device;
    searching for the source address in the buffer device on the basis of an association relationship between a page included in the buffer device and an address in the underlying storage device;
    based on a result of the searching for the source address in the buffer device, updating information associated with the destination address, wherein each of the source address and the destination address has an access count associated therewith; and
    in response to the source address being missed in the buffer device, incrementing the access count associated with the source address,
    wherein the updating of the information associated with the destination address comprises:
        adding the access count associated with the source address to the access count associated with the destination address to obtain an updated destination address.

2. The method according to claim 1, wherein the updating information associated with the destination address on the basis of a result of the search comprises:
    in response the source address being missed in the buffer device, setting an access count associated with the destination address on the basis of an access count associated with the source address.

3. The method according to claim 2, further comprising:
    in response to the access count associated with the destination address meeting a threshold condition, loading data at the destination address to a destination page in the buffer device; and establishing an association relationship between the destination page and the destination address.

4. The method according to claim 1, wherein the updating information associated with the destination address on the basis of a result of the search comprises:
in response to the source address being hit in the buffer device, determining a write type of the write request; and
updating information associated with the destination address on the basis of the write type.

5. The method according to claim 4, wherein the write type corresponds to an overwrite type that indicates data from the source address after being modified is to be written to the destination address, and wherein the updating information associated with the destination address on the basis of the overwrite type comprises:
allocating a destination page in the buffer device for the destination address;
writing the modified data to the destination page; and
establishing an association relationship between the destination page and the destination address.

6. The method according to claim 5, wherein the writing the modified data to the destination page comprises:
reading data from a page associated with the hit;
modifying the read data; and
writing the modified data to the destination page.

7. The method according to claim 6, further comprising:
clearing an association relationship between a page associated with the hit and the source address; and
releasing the page associated with the hit.

8. The method according to claim 4, wherein the write type corresponds to a copy type that indicates data from the source address is to be written to the destination address, and wherein the updating information associated with the destination address on the basis of the copy type comprises:
establishing an association relationship between a page associated with the hit and the destination address.

9. The method according to claim 1, further comprising:
in response to a page in the buffer device being updated, flushing the updated page to the underlying storage device on the basis of the association relationship.

10. The method according to claim 1, wherein the acquiring the source address and the destination address comprises:
acquiring the destination address and the source address from the data write request.

11. A device for managing a storage system, the storage system comprising a multi-layer storage structure including at least a buffer device and an underlying storage device, comprising:
one or more processors;
a memory coupled to at least one processor of the one or more processors;
computer program instructions stored in the memory which, when executed by the at least one processor, cause the device to execute a method for managing a storage system, the method comprising:
in response to receiving a write request with respect to the storage system, acquiring a destination address associated with the write request, the destination address being an address in the underlying storage device;
acquiring a source address associated with data to be written to the destination address, the source address being an address in the underlying storage device;
searching for the source address in the buffer device on the basis of an association relationship between a page included in the buffer device and an address in the underlying storage device;
based on a result of the searching for the source address in the buffer device, updating information associated with the destination address, wherein each of the source address and the destination address has an access count associated therewith; and
in response to the source address being missed in the buffer device, incrementing the access count associated with the source address,
wherein the updating of the information associated with the destination address comprises:
adding the access count associated with the source address to the access count associated with the destination address to obtain an updated destination address.

12. The device according to claim 11, wherein the updating information associated with the destination address on the basis of a result of the search comprises:
in response the source address being missed in the buffer device, setting an access count associated with the destination address on the basis of an access count associated with the source address.

13. The device according to claim 12, the method further comprising:
in response to the access count associated with the destination address meeting a threshold condition, loading data at the destination address to a destination page in the buffer device; and
establishing an association relationship between the destination page and the destination address.

14. The device according to claim 11, wherein the updating information associated with the destination address on the basis of a result of the search comprises:
in response to the source address being hit in the buffer device, determining a write type of the write request; and
updating information associated with the destination address on the basis of the write type.

15. The device according to claim 14, wherein the write type corresponds to an overwrite type that indicates data from the source address after being modified is to be written to the destination address, and wherein the updating information associated with the destination address on the basis of the overwrite type comprises:
allocating a destination page in the buffer device for the destination address;
writing the modified data to the destination page; and
establishing an association relationship between the destination page and the destination address.

16. The device according to claim 15, wherein the writing the modified data to the destination page comprises:
reading data from a page associated with the hit;
modifying the read data; and
writing the modified data to the destination page.

17. The device according to claim 16, the method further comprising:
clearing an association relationship between a page associated with the hit and the source address; and
releasing the page associated with the hit.

18. The device according to claim 14, wherein the write type corresponds to a copy type that indicates data from the source address is to be written to the destination address, and wherein the updating information associated with the destination address on the basis of the copy type comprises:
establishing an association relationship between a page associated with the hit and the destination address.

19. The device according to claim 11, the method further comprising:
   in response to a page in the buffer device being updated, flushing the updated page to the underlying storage device on the basis of the association relationship.

20. The device according to claim 11, wherein the acquiring the source address and the destination address comprises: acquiring the destination address and the source address from the data write request.

* * * * *